(12) United States Patent
Heatwole et al.

(10) Patent No.: US 6,937,580 B2
(45) Date of Patent: Aug. 30, 2005

(54) APPORTIONING BANDWIDTH CAPACITY IN COMMUNICATION SWITCHING SYSTEMS

(75) Inventors: Antony Heatwole, Damascus, MD (US); Sreenivas Ramaswamy, Bethesda, MD (US); William Walsh, Anaheim Hills, CA (US); Mark Abinante, Inglewood, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 826 days.

(21) Appl. No.: 09/783,849

(22) Filed: Feb. 15, 2001

(65) Prior Publication Data

US 2002/0021678 A1 Feb. 21, 2002

Related U.S. Application Data

(60) Provisional application No. 60/216,100, filed on Jul. 6, 2000.

(51) Int. Cl.$^7$ ............................................. H04B 7/212
(52) U.S. Cl. ...................... 370/322; 370/232; 370/233; 370/235; 370/320; 370/325; 370/328; 370/329; 370/443; 370/444; 370/468
(58) Field of Search ................................. 370/232, 233, 370/235, 320, 322, 325, 328, 329, 443, 444, 468, 335, 342

(56) References Cited

U.S. PATENT DOCUMENTS

| | | | | |
|---|---|---|---|---|
| 4,763,325 A | * | 8/1988 | Wolfe et al. ................. | 370/322 |
| 5,274,644 A | | 12/1993 | Berger et al. | |
| 5,392,280 A | | 2/1995 | Zheng | |
| 5,592,470 A | * | 1/1997 | Rudrapatna et al. ......... | 370/320 |
| 6,223,219 B1 | * | 4/2001 | Uniacke et al. .............. | 709/223 |
| 6,434,129 B1 | * | 8/2002 | Struhsaker et al. .......... | 370/329 |
| 6,493,804 B1 | * | 12/2002 | Soltis et al. ................. | 711/152 |
| 6,647,428 B1 | * | 11/2003 | Bannai et al. ................ | 709/245 |
| 6,668,174 B1 | * | 12/2003 | Struhsaker et al. .......... | 455/450 |
| 6,741,572 B1 | * | 5/2004 | Graves et al. ............... | 370/254 |
| 2002/0035559 A1 | * | 3/2002 | Crowe et al. | |
| 2003/0198241 A1 | * | 10/2003 | Putcha et al. | |

FOREIGN PATENT DOCUMENTS

WO WO 97/35410 9/1997

OTHER PUBLICATIONS

System and Method for a Decision Engine and Architecture for Providing High–Performance Data Querying Operations.*

Putcha et al., Allocating Buffers for Data Transmission in a Network Communication Device.*

* cited by examiner

*Primary Examiner*—Wellington Chin
*Assistant Examiner*—Kevin Mew
(74) *Attorney, Agent, or Firm*—Craig Plastrik

(57) ABSTRACT

An approach for allocating system capacity of a communication switching system for exchange of traffic is disclosed. The system includes multiple terminals that request allocations of system capacity. The capacity is partitioned into a provisioned portion and an unprovisioned portion, in which a portion of the terminals constitutes a pool having a plurality of sub-pools. According to one embodiment, a control computer communicates with the plurality of terminals and allocates the provisioned portion of the capacity to the plurality of sub-pools of the terminals. The provisioned portion of the capacity is arranged into sub-partitions, wherein one of the sub-partitions is not associated with the sub-pools of terminals. Remaining sub-partitions are associated with the sub-pools of terminals. The control computer selectively allocates available capacity from the sub-partitions to one of the sub-pool terminals to permit overflow of traffic from the one sub-pool terminal, and selectively allocates the unprovisioned portion of the capacity to the pool to permit overflow of traffic from a terminal within the pool and to a terminal that is not a part of the pool of terminals.

34 Claims, 9 Drawing Sheets

APPORTIONING BANDWIDTH CAPACITY IN COMMUNICATION SWITCHING SYSTEMS

CROSS-REFERENCES TO RELATED APPLICATION

This application is related to, and claims the benefit of the earlier filing date of, U.S. Provisional Patent Application No. 60/216,100, filed Jul. 6, 2000, entitled "Capacity Allocation for Connectionless Traffic," the entirety of which is incorporated herein by reference.

BACKGROUND OF THE INVENTION

1. Field of the Invention

The present invention relates generally to communication systems, and is more particularly related to providing bandwidth-on-demand in a switching communication system

2. Discussion of the Background

As society, in general, becomes increasingly reliant on communication networks to conduct a variety of activities, ranging from business transactions to personal entertainment, communication engineers continually face the challenges of optimizing use of network capacity and ensuring network availability to a diverse set of users with varying traffic requirements. Because capacity requirements of different users, for that matter of the same users, can fluctuate depending on time day and applications, the accuracy of traffic forecasts is diminished. Inaccurate forecasts can lead to negative effects in network performance, such as traffic congestion, slow response times, or even loss data. The maturity of electronic commerce and acceptance of the Internet as a daily tool by millions of users (this user base continues to grow) only intensify the need to develop techniques to streamline capacity usage. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements in the network infrastructure. In fact, sophisticated users typically negotiate service level agreements with the service provider to ensure that they receive a guaranteed level of service in network performance. Therefore, efficient use of network capacity is imperative, particularly in systems in which finite capacity needs to be managed carefully, such as a satellite network.

Satellite communication systems have emerged as an accessible and reliable network infrastructure that can support the exchange of voice, video, and data traffic. Conventionally, these satellite communication systems offer dedicated communication channels that relay or tunnel traffic without processing such traffic (i.e., "bent pipe"). That is, the satellite has no knowledge of what types of protocols are used or data that is contained within the packets. One drawback with these satellite communication systems is that they are highly inefficient with respect to bandwidth allocation. For example, if the satellite has excess transponder bandwidth at a particular time, this excess capacity cannot be readily reapportioned to another satellite terminal (ST). Another drawback is that the satellite cannot perform any processing on the received traffic; thus, key networking functions, such as flow control and congestion control, are not available at the satellite. Yet another drawback concerns the inflexibility of the system to adapt dynamically to the traffic requirements of the STs. Given the bursty nature of Internet traffic, traffic emanating from the STs can vary greatly, thereby making it technically impractical to adjust the static channel assignments of the traditional bent pipe satellite systems. The end result may be an inability to ensure bandwidth guarantees to the subscribers.

Based on the foregoing, there is a clear need for improved approaches for transporting traffic over a satellite communication system.

There is also a need to enhance efficient utilization of system capacity.

There is also a need to employ a flexible architecture that provides increased network functionalities.

There is a further need to dynamically adapt to bandwidth requirements of the satellite terminals.

There is still a further need to provide bandwidth guarantees to the subscribers.

Based on the need to improve system efficiency, an approach for providing bandwidth-on-demand in a satellite communication system is highly desirable.

SUMMARY OF THE INVENTION

According to one aspect of the invention, a method is provided for allocating system capacity to a plurality of terminals in a communication switching system. The capacity is partitioned into a provisioned portion and an unprovisioned portion, in which a portion of the terminals constitute a pool having a plurality of sub-pools. The method includes allocating the provisioned portion of the capacity to the plurality of sub-pools of the terminals. The provisioned portion of the capacity is arranged into sub-partitions, wherein one of the sub-partitions is not associated with the sub-pools of terminals, and remaining sub-partitions are associated with the sub-pools of terminals. The method includes selectively allocating available capacity from the sub-partitions to one of the sub-pool terminals to permit overflow of traffic from the one sub-pool terminal. The method further includes selectively allocating the unprovisioned portion of the capacity to the pool to permit overflow of traffic from a terminal within the pool and to a terminal that is not a part of the pool of terminals. Under this approach, the system capacity of communication switching system can be managed efficiently.

According to another aspect of the invention, a communication switching system comprises a plurality of terminals that are configured to request allocations of capacity of the system. The capacity is partitioned into a provisioned portion and an unprovisioned portion, in which a portion of the terminals constitutes a pool having a plurality of sub-pools. A control computer communicates with the plurality of terminals and is configured to allocate the provisioned portion of the capacity to the plurality of sub-pools of the terminals. The provisioned portion of the capacity is arranged into sub-partitions, wherein one of the sub-partitions is not associated with the sub-pools of terminals. Remaining sub-partitions are associated with the sub-pools of terminals. The control computer selectively allocates available capacity from the sub-partitions to one of the sub-pool terminals to permit overflow of traffic from the one sub-pool terminal, and selectively allocates the unprovisioned portion of the capacity to the pool to permit overflow of traffic from a terminal within the pool and to a terminal that is not a part of the pool of terminals. The above arrangement advantageously adapts dynamically to bandwidth requirements of the terminals.

In yet another aspect of the invention, a computer-readable medium carrying one or more sequences of one or more instructions for allocating system capacity to a plurality of terminals in a communication switching system is disclosed. The capacity is partitioned into a provisioned portion and an unprovisioned portion, in which a portion of the terminals constitutes a pool having a plurality of sub-pools. The one or more sequences of one or more instructions include instructions which, when executed by one or more processors, cause the one or more processors to perform the step of allocating the provisioned portion of the capacity to the plurality of sub-pools of the terminals. The provisioned portion of the capacity is arranged into sub-partitions, wherein one of the sub-partitions is not associated with the sub-pools of terminals, and remaining sub-partitions are associated with the sub-pools of terminals. Another step includes selectively allocating available capacity from the sub-partitions to one of the sub-pool terminals to permit overflow of traffic from the one sub-pool terminal. Another step includes selectively allocating available capacity from the sub-partitions to one of the sub-pool terminals to permit overflow of traffic from the one sub-pool terminal. Yet another step includes selectively allocating the unprovisioned portion of the capacity to the pool to permit overflow of traffic from a terminal within the pool and to a terminal that is not a part of the pool of terminals. This approach advantageously optimizes usage of system capacity.

According to yet another aspect of the invention, a communication switching system for allocating system capacity to a plurality of terminals in a satellite communication system is disclosed. The system has capacity that is partitioned into a provisioned portion and an unprovisioned portion, in which a portion of the terminals constitutes a pool having a plurality of sub-pools. The system comprises means for allocating the provisioned portion of the capacity to the plurality of sub-pools of the terminals. The provisioned portion of the capacity is arranged into sub-partitions, wherein one of the sub-partitions is not associated with the sub-pools of terminals; the remaining sub-partitions are associated with the sub-pools of terminals. The system also includes means for selectively allocating available capacity from the sub-partitions to one of the sub-pool terminals to permit overflow of traffic from the one sub-pool terminal, and a means for selectively allocating the unprovisioned portion of the capacity to the pool to permit overflow of traffic from a terminal within the pool and to a terminal that is not a part of the pool of terminals. Under the above approach, an efficient bandwidth allocation scheme is provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes bandwidth-on-demand (BoD) with respect to traffic originating from multiple terminals in a communication switching system. The terminals request allocations of system capacity, which is partitioned into a provisioned portion and an unprovisioned portion. The terminals are organized into pools and sub-pools. That is, a portion of the terminals constitutes a pool that is further divided into sub-pools. A control computer communicates with the terminals and allocates the provisioned portion of the capacity to the sub-pools of terminals. The provisioned portion of the capacity is arranged into sub-partitions, wherein one of the sub-partitions is not associated with the sub-pools of terminals. The remaining sub-partitions are associated with the sub-pools of terminals. The control computer selectively allocates available capacity from the sub-partitions to one of the sub-pool terminals to permit overflow of traffic from the one sub-pool terminal, and selectively allocates the unprovisioned portion of the capacity to a terminal that is not a part of the pool of terminals.

Although the present invention is described with respect to a satellite communication system, it is recognized by one of ordinary skill in the art that the present invention has applicability to communication switching systems in general. For example, the present invention may be practiced in any of the following systems: a cellular network, a local multipoint distribution services (LMDS) system, a wireless local area network (LAN), a multi-port router, and etc.

Figure 1:
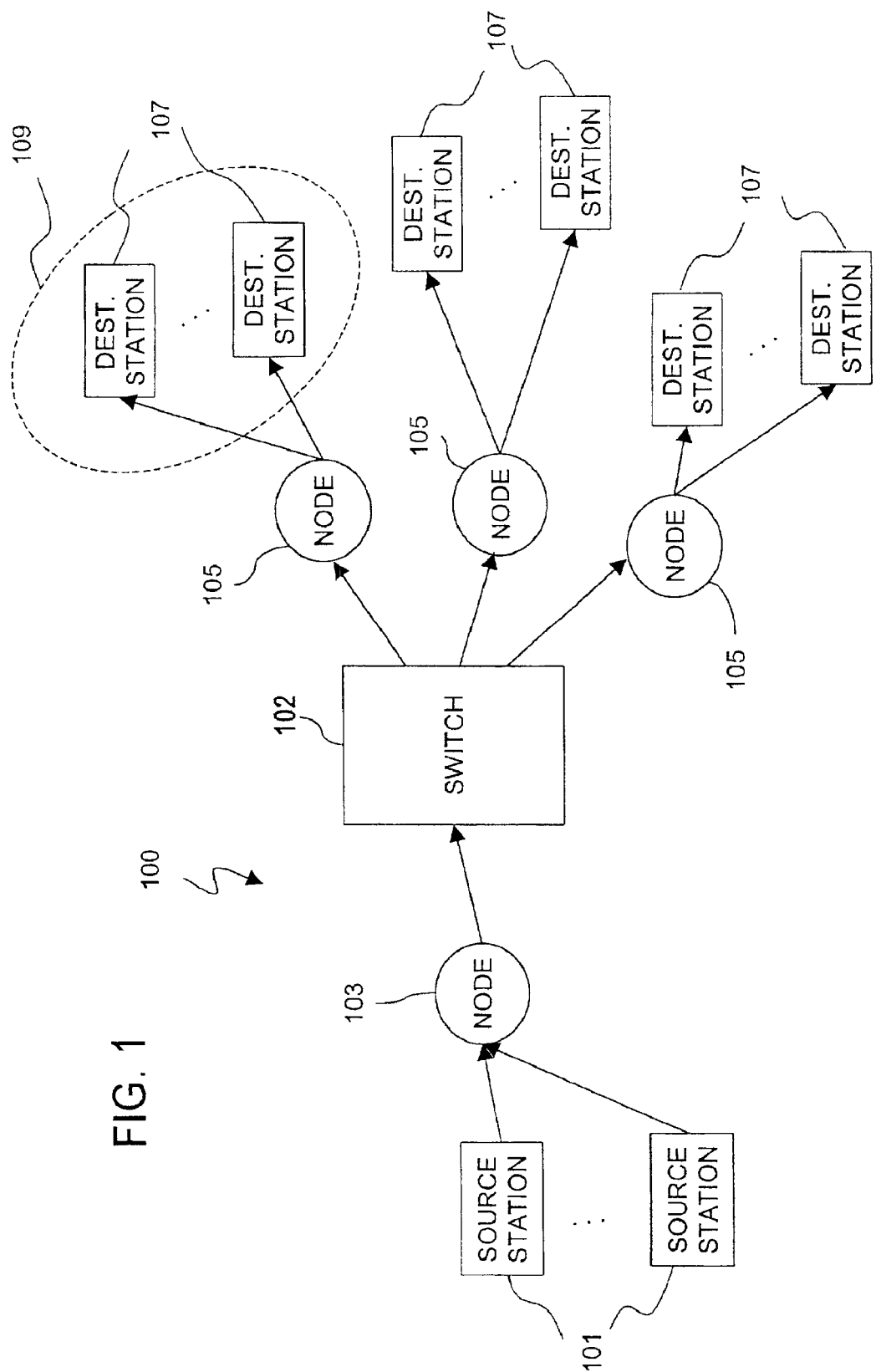
FIG. 1 is a diagram of a communication switching system that is capable of supporting the apportioning of bandwidth capacity, according to an embodiment of the present invention.

FIG. 1 shows a communication switching system, according to an embodiment of the present invention. A communication network 100 includes multiple source stations 101 that generate traffic to node 103, which can be any networking equipment that transfers data. In an exemplary embodiment, node 103 is an internetworking device, such as a router; alternatively, node 103 may be any type of gateway in a land-based or satellite-based communication system. Node 103 is connected to an input port of switch 102. The output ports of switch 102 connects to multiple nodes 105, which can be the same networking component as that of node 103. As shown, each of the nodes 105 can potentially communicate with numerous destination stations 107 within region 109 (e.g., sub-network). For example, if nodes 105 are routers, the routers would have multiple output ports designated for region 109.

As indicated previously, the conventional communication network exhibits performance characteristics that are dictated largely by the hardware limitations of switch 102. In other words, the throughput of the network 100 depends on such parameters as buffer size and processing capability of switch 102. In some practical systems, however, the communication network 100 possess network bottlenecks at points in the network other than the switch 102. For example, assuming that for security reasons, destination stations 107 within region 109 cannot simultaneously receive packets, consequently switch 102 may need to buffer some of the packets until the first set of packets are delivered to the particular destination stations 107. Thereafter, the buffered packets within switch 102 can be delivered to the destination stations 107 within region 109. From this example, it is clear that the buffering of the packets within switch 102 can result in system performance that does not depend on the hardware capabilities of switch 102, but instead on the network constraints associated with region 109.

The above scenario is characteristic of a satellite communication system

For the purposes of explanation, the operation of the queueing mechanism according to an embodiment of the present invention, is discussed with respect to a satellite communication system with transmission constraints to downlink spot beams. However, it should be noted that the approach has applicability to many other switching systems, as recognized by one of ordinary skill in the art. For example, the switching systems may include an ATM (Asynchronous Transfer Mode)/SONET (Synchronous Optical Network) network, a Gigabit Ethernet network, and voice network. The end stations of these systems are referred to as destination sites. Accordingly, the destination sites in a satellite system would be downlink spot beams.

Figure 2:
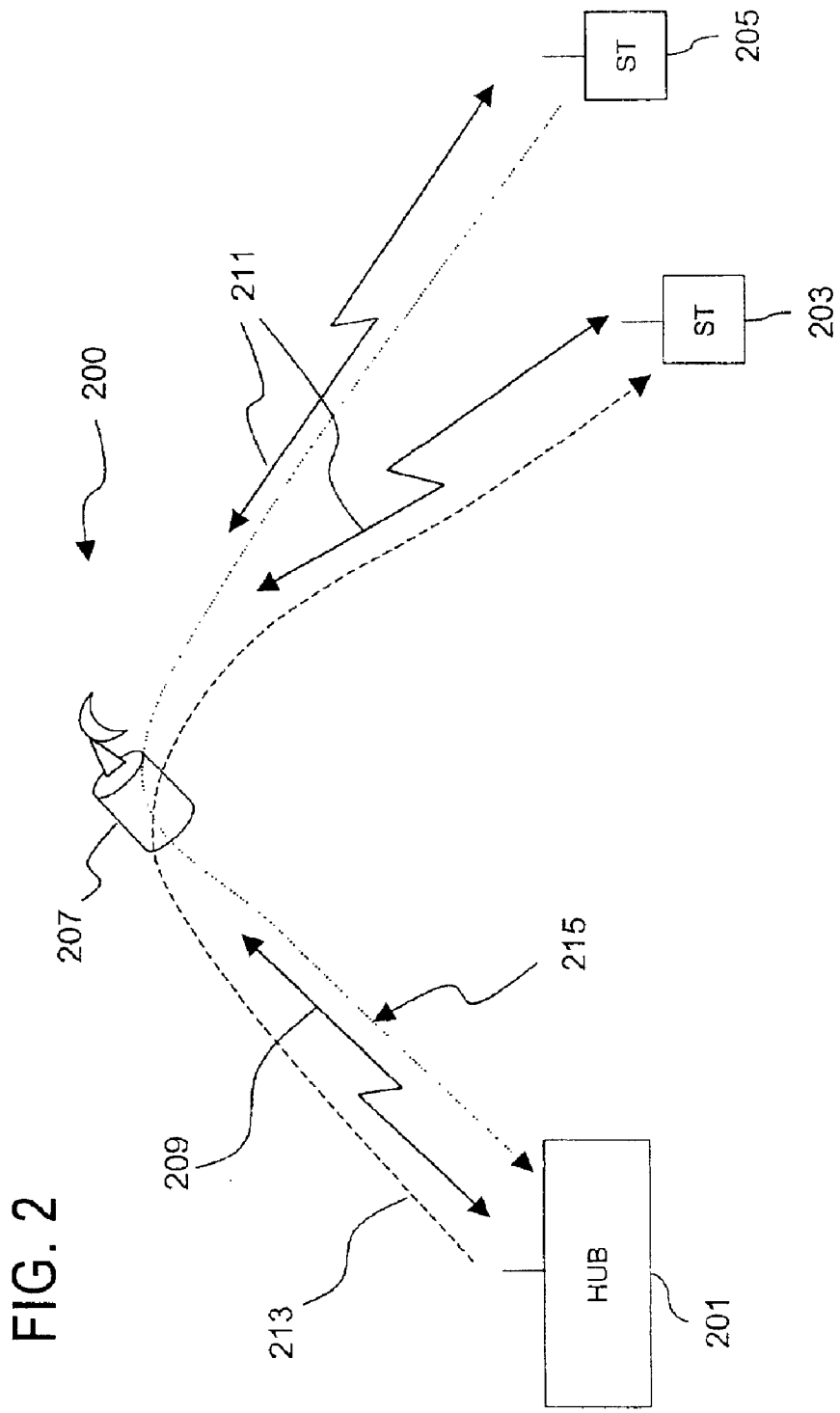
FIG. 2 is a diagram of a satellite communication system with the functionality to apportion bandwidth capacity, according to an embodiment of the present invention.

FIG. 2 shows a satellite communication system utilizing a carrier identification function, according to an embodiment of the present invention. Network operators need to manage satellite capacity efficiently in order to support the large variety of users and applications, and maintain reasonable operational costs. System 200 is a demand-assigned multiple access (DAMA) Bandwidth-on-Demand (BOD) system. The DAMA system 200 allocates the available bandwidth into common bandwidth (BW) pools for use by satellite terminals (STs). The DAMA system 200 provides a single hop satellite transmission network, whereby multiple STs share a limited "pool" of satellite transponder capacity; however, the system 200 can be implemented using multiple hops. As the terminology suggests, the system 200 allocates bandwidth on a demand-assigned basis, wherein the bandwidth is returned to the common pool upon termination of a communication session (or call). In this manner, the transponder of satellite 207 can be shared by numerous STs 203 and 205.

As shown in FIG. 2, satellite communication system 200 includes a hub 201 (or gateway station) that communicates with STs 203 and 205 (or packet data modules (PDMs)) through satellite 207 over channels 209 and 211. For the purposes of explanation, a convention is adopted whereby the communication path 213 from hub 201 to the satellite 207 down to an ST, which in this example is ST 203, is denoted as the downlink. Conversely, a communication path 215 from ST 205 up to the satellite 207 and down to the hub 201 is referred to as the uplink 209.

Unlike conventional bent-pipe satellite systems, satellite 207 demodulates fixed-length packets that are received from STs on uplink spot beams, queues the packets for the proper downlink destination based on packet header information, and then modulates the packets for transmission on the specified downlink spot beam. Satellite 207 employs spot beams and possesses processing functions that permit greater power and spectral efficiency than traditional bent-pipe satellites.

Satellite 207 contains a control computer (CC) (not shown) and a fast packet switch (FPS) (not shown). Exemplary switches include an ATM (Asynchronous Transfer Mode) switch, and a Gigabit Ethernet switch; it is recognized by one of ordinary skill in the art that any type of switch can be utilized. The FPS transfers the packets that the payload of the satellite 207 receives on the uplinks to the proper downlinks. The payloads of satellite 207, along with the PCC and the FPS, include other components, such as uplink antenna, down-converters, switch matrix, demodulator banks, and phased-array downlink antenna; these other components are well-known, and thus, are not described in detail. The CC performs the necessary bandwidth control functions, in conjunction with hub 201 to honor bandwidth requests from the STs 103 and 105 on a single allocation or a continual allocation basis.

Figure 3:
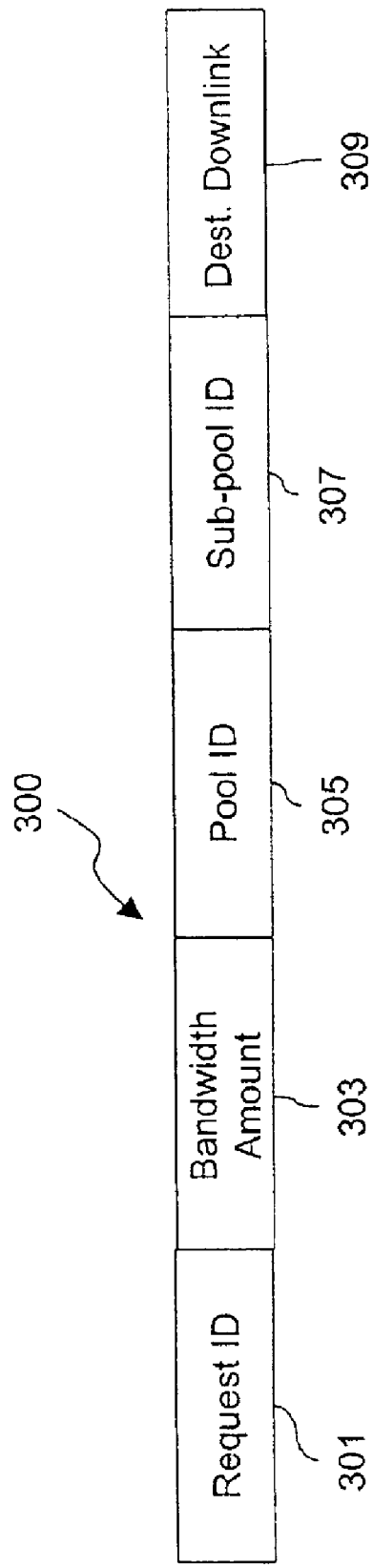
FIG. 3 is a diagram of the format of a bandwidth request message, in accordance with an embodiment of the present invention.

FIG. 3 shows a diagram of the format of a bandwidth request message, in accordance with an embodiment of the present invention. A request message 300 includes a request identification (ID) field 301 that specifies the particular request. A bandwidth amount field 303 indicates the desired bandwidth that the sender of the request seeks. In addition, the request message 300 contains a pool (i.e., group) identification (ID) field 305 that conveys a particular pool that the desired bandwidth amount should be assigned. An optional sub-pool ID field 307 is provided if the bandwidth request pertains to a sub-partition, as more fully described below with respect to FIG. 5. Further, a destination downlink field 309 specifies the downlink spot beam where the packets are to be forwarded. As used herein, the terms "pool" and "group" are used synonymously; similarly, "sub-pool" and "sub-group" are used interchangeably. Also, the term "partition" refers to the portion of system capacity that a group or pool seeks. A "sub-partition" defines the division of the partition of system capacity corresponding to a particular sub-group within the group.

Figure 4:
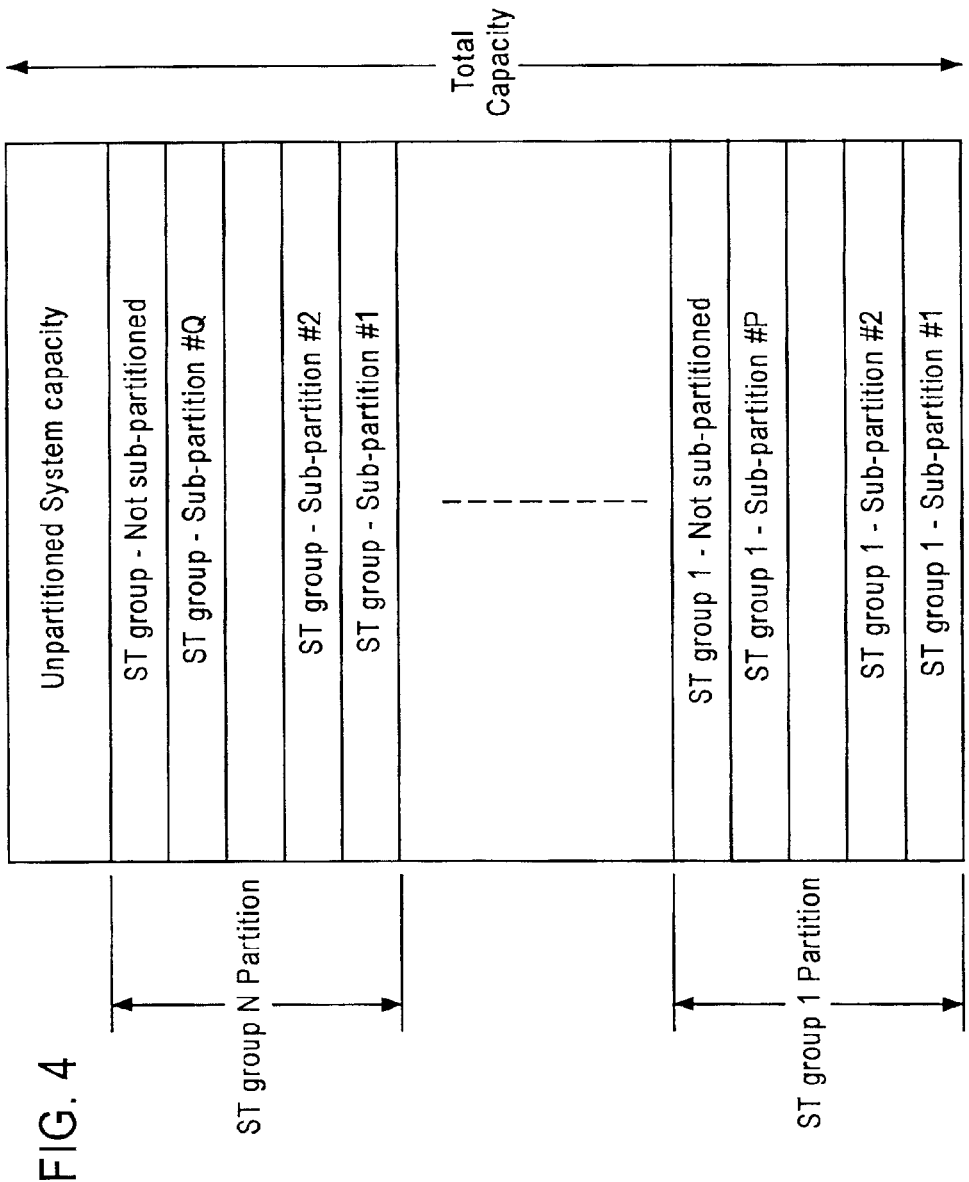
FIG. 4 is a diagram of the capacity partition in each uplink spot beam and downlink spot beam of the system of FIG. 2.

FIG. 4 shows a diagram of the capacity partition in each uplink spot beam and downlink spot beam of the system of FIG. 2. For the purposes of explanation, the system 200 (of FIG. 2) is described with respect to two levels of ST groups. That is, an ST group is further divided into sub-groups (i.e., sub-pools). System 200 has the capability to allocate to an ST group a dedicated amount of system capacity for best effort traffic on an aggregate basis (i.e., from the perspective of the collective set of ST groups) and on an individual ST group basis.

System 200 support a diverse set of STs, which have different traffic requirements. Depending on the traffic that each ST supports, the system 200 may treat the STs differently with respect to capacity allocation and bandwidth control, as the STs may have varying transmission capabilities. In system 200, every ST, including those that do not use downlink capacity allocation, operate with a fixed uplink assignment. That is, the ST is apportioned a specific amount of system capacity (e.g., channel) that the ST can transmit on in every capacity allocation interval. The channel assignments may change at any interval, for example, once per hour.

The capacity allocation function for all ST types is based on the concept of a downlink spot beam, for example, which serves the appropriate STs. Limiting the total amount of traffic that can be apportioned to each downlink spot beam from all partitions to just the physical capacity of one downlink beam will not completely mitigate downlink congestion. Accordingly, the total allocatable traffic should not exceed, for example, 50% of the available capacity of one downlink beans. Any "spare" capacity can be used by unapportioned traffic or apportioned traffic that overflows its guarantees.

FIG. 4 shows the parameters that make up the configuration for each ST capacity partition. The ST group partitions correspond to pools of STs that are associated with the corresponding ST group. The parameters in the partition are the rates at which packets can be transmitted into the specified downlink spot beam by STs that have been configured to use the partition. All STs that are configured to use a particular ST downlink partition are associated with the same ST group. However, an ST group may have several groups of STs that are each configured to use different ST downlink partitions. Traffic for an ST group downlink partition cannot be configured to "overflow" into unused capacity in other partitions. The capacity allocation process is more fully described with respect FIG. 5.

The CC of satellite 207 dynamically assigns each ST a rate at which it can transmit uplink packets to be delivered to each downlink spot beam. The capacity allocation requirement fits into this scheme by simply adding coordination of the assignments given to the pools (or groups) of STs assigned to each partition so that their combined transmission rates into each downlink spot beam do not exceed the parameter configured in their ST downlink capacity partitions.

In FIG. 4, the relationship between the capacity partitions and sub-partitions in an uplink spot beam or downlink spot beam is shown. According to one embodiment of the present invention, two levels of capacity partitioning exist. An ST group may have an overall partition within which it has sub-partitions that can be apportioned to specific customers or ST groups. If the system 200 grants a request for capacity from an ST from a sub-partition, then this capacity is subtracted from the available capacity in that ST's uplink spot beam and from the requested destination downlink spot beam for both the sub-partition and the partition. A capacity partition is a specification for the maximum rates at which packets that are apportioned to be transmitted. A capacity sub-partition is a further dividing of uplink and downlink maximum.

Each ST 203 and 205 is configured to have a semi-permanent, fixed, uplink allocation that does not vary with the traffic loading. Each ST's uplink allocation may change according to a time-of-day profile; the change may occur at any rate of up to once per hour.

Figure 5:
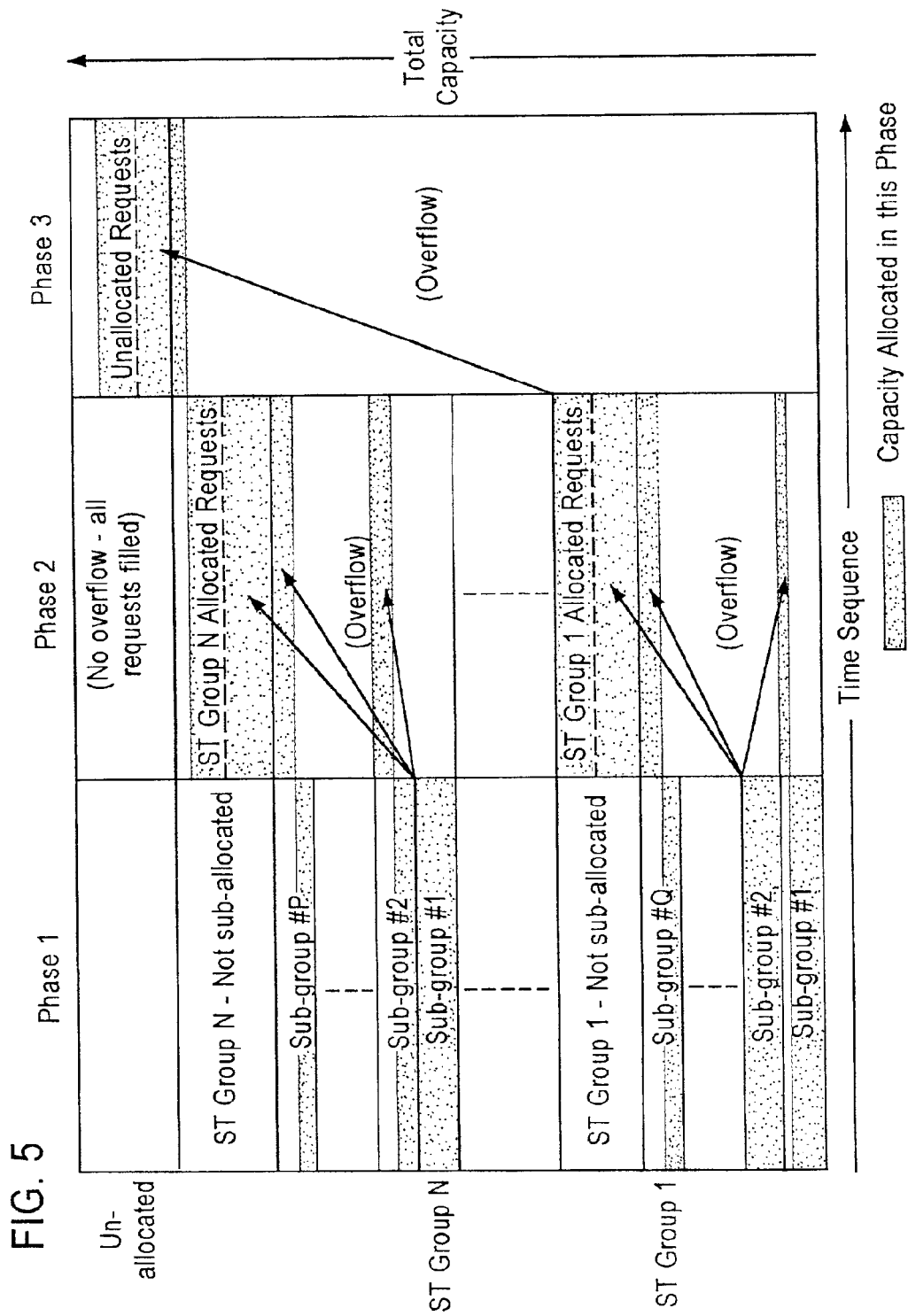
FIG. 5 is a diagram of the capacity allocation timing sequence performed by a control computer (CC), according to an embodiment of the present invention.

FIG. 5 shows a diagram of the capacity allocation sequence performed by the control computer (CC), according to an embodiment of the present invention. Specifically, FIG. 5 shows the timing sequence in which the CC processes bandwidth requests from STs 203 and 205 in each capacity allocation interval. The capacity allocation for all capacity partitions in a particular uplink spot beam or downlink spot beam is shown. Each bandwidth or capacity request requires allocation of both uplink capacity and downlink capacity.

The system operator can configure either zero or one capacity partition for each ST group, subject to the limit on the total number of capacity partitions. If an ST group has a capacity partition configured for it, the system 200 may be configurable to sub-divide that capacity partition of the ST group into sub-partitions or sub-groups. The system operator can configure a time-of-day profile for each capacity partition and sub-partition that specifies changes in the individual partition parameters, as a complete set, at a rate of up to once per hour. STs 203 and 205 that belong to a particular ST group are allowed to request capacity from that ST group's capacity partition. STs 203 and 205 within a particular ST group can request capacity from specific sub-partitions within that ST group's capacity partition. STs 203 and 205 may request capacity from a single capacity partition/sub-partition or without specifying a capacity partition, based on the type of traffic to be transmitted. The system 200 fills requests for capacity that do not specify a capacity partition using unpartitioned capacity or partitioned capacity that is not currently being used. The system 200 permits each capacity partition and sub-partition to be configured to serve or deny requests that would exceed (overflow) any capacity partition parameter to be filled with remaining capacity, if any, outside the requested partition or sub-partition.

When a capacity sub-partition is configured to allow overflow, the system 200 fills capacity requests that are made to that sub-partition in excess of the configured partition values from available capacity, if any, from the ST group's capacity partition. When an ST group capacity partition is configured to allow overflow, the system 200 can fill capacity requests made to that capacity partition in excess of the configured partition or sub-partition values from available system capacity, if any. The system 200 may make a capacity allocation for an ST request that is successfully received at the satellite 207 and requests capacity from a capacity partition or sub-partition when capacity is available from within the specified partition or sub-partition in the ST's uplink spot beam and to the requested destination site.

When an ST 203 and 205 makes a bandwidth request, the ST 203 and 205 specifies one of three capacity partition parameters in its request: (1) ST group sub-partition, (2) ST group partition, and (3) un-allocated. With an ST group sub-partition, an ST 203 and 205 can only make such a request if the ST 203 and 205 is configured to allow requests for the specified sub-partition. The ST 203 and 205 is configured so that the sub-partition is one of the sub-partitions of the ST group that is associated with the ST 203 and 205. This type of request has up to three opportunities to be satisfied (or filled). Specifically, the request can be served from the requested sub-partition. If the sub-partition has no remaining capacity for either the STs uplink spot beam or the destination downlink spot beam, and if the sub-partition is configured to allow overflow, the request can be satisfied from the ST group's unallocated partition or capacity unused by other sub-partitions within the same ST group.

If the ST group partition has no remaining capacity for either the STs uplink spot beam or the destination downlink spot beam, and if the ST group partition is configured to allow overflow, the request can be satisfied from the unallocated system capacity partition or from capacity that is unused by another ST group partition or sub-partition.

In the case of the ST group partition, an ST (e.g., 203 and 205) is associated with the ST group whose partition is specified by the ST (e.g., 203 and 205). This type of request has up to two opportunities to be filled. The request can be served from the requested ST group partition. Additionally, if the ST group partition has no remaining capacity for either the ST's uplink spot beam or the destination downlink spot beam, and if the ST group partition is configured to allow overflow, the request can be satisfied from the unapportioned system capacity partition or from capacity that is unused by another ST group partition or sub-partition.

In a third scenario, a request can be served only from the unapportioned system capacity partition or from capacity that is unused by an ST group partition or sub-partition. Each ST 203 and 205 is configured to make requests from a single capacity partition (or sub-partition) or for no partition (unapportioned requests) based on the type of traffic that it is carrying.

As evident from the above discussion, the bandwidth apportionment process is performed in essentially three phases, whereby spare capacity after each phase is made available to the subsequent phase. In Phase 1, the CC processes only requests that specify an ST group sub-partition (i.e., sub-pool). The CC examines all such requests to make an allocation for the request, or, if there is insufficient capacity in the sub-partition available in the ST's uplink spot beam or the requested destination downlink spot beam, to put the request aside temporarily for this phase. The CC proceeds to the next request, which specifies an ST group capacity partition. All such requests will be processed, for all ST groups, until either there are no more requests or the guaranteed bounds have been met. In this example, ST group 1 sub-group #2 and ST group N sub-group #1 reached the limits of the partition for the resource downlink spot beam during the first allocation phase. Bandwidth requests that specify a pool ID will be treated as "provisioned" traffic and all other requests will be treated as "non-provisioned" traffic. Provisioned traffic will be processed before non-provisioned traffic in every frame. Provisioned requests are those that specify a pool ID; these requests are divided into sub-partition requests (those that specify a sub-group ID and an ST group ID) and partition requests (those that specify only an ST group ID).

In Phase 2, all unallocated partition requests for each ST group and unallocated sub-partition requests for all sub-pools within the ST group are apportioned up to the total capacity available for that ST group. The CC processes requests that specify an ST group partition (but not a sub-partition within the ST group) and requests specifying sub-partitions that allow overflow that could not be satisfied in the first phase. Upon examining these requests, the CC allocates the requested capacity using a portion of the capacity associated with the ST group capacity partition. However, if there is insufficient capacity in the ST group's partition downlink spot beam, the CC puts the request aside for this phase and moves on to the next request.

In Phase 3, any unallocated partition requests (i.e., provisioned requests) will compete with non-provisioned requests for allocations for unused capacity. Unallocated requests from a previous phase are only considered if they are allowed to overflow beyond their guaranteed capacity, based on customer provisioning agreements. The CC processes all requests that did not specify any capacity partition as well as the requests for allocations from ST group 1's capacity partition that could not be satisfied in the second allocation phase using the remaining capacity, if any. As seen in FIG. 5, after Phases 1 and 2, requests for the ST group 1 partition, ST group N partition, and overflow traffic from the ST group 1 sub-group #2 and ST group N sub-group #1 partitions are apportioned by the CC. The ST group 1 partition is completely filled at the end of the second phase, while ST group N's partition has some spare capacity.

The total capacity apportioned is the sum of all the capacity apportioned in each of the three phases. Conceptually, the total capacity is the "sum" or horizontal meshing of all of the shaded areas in FIG. 5. In this example, it is assumed that the intermediary ST groups have no spare capacity after the first phase; that is, these partitions ST group 2-ST group (N–1) are filled exactly (or were over-subscribed but not configured for overflow).

This approach assumes that since the amount of capacity that is allowed to be apportioned to each downlink spot beam is less than the likely actual capacity, no request would be denied an allocation because of downlink congestion mitigation in either of the first two allocation phases described above. Because the downlink capacity for a downlink spot beam may vary depending on the actual geographical distribution of the downlink traffic, the total capacity in a downlink spot beam varies. This variation is accounted for by the variation in the size of the unprovisioned, without ever eliminating this unprovisioned partition entirely and depleting the provisioned capacity.

After these three allocation phases are complete, there are two post-allocation phases that must be executed (which is more fully discussed in FIG. 7) to ensure that provisioned requests that were displaced in the current frame (so that they could compete with non-provisioned requests), are reinstated so that they can compete fairly in the next frame with the other provisioned requests. In an exemplary embodiment, the other post-allocation phase involves balancing the downlink threshold tables for each ST group pool between multiple CCs (if multiple CCs are required in satellite 207).

Figure 6:
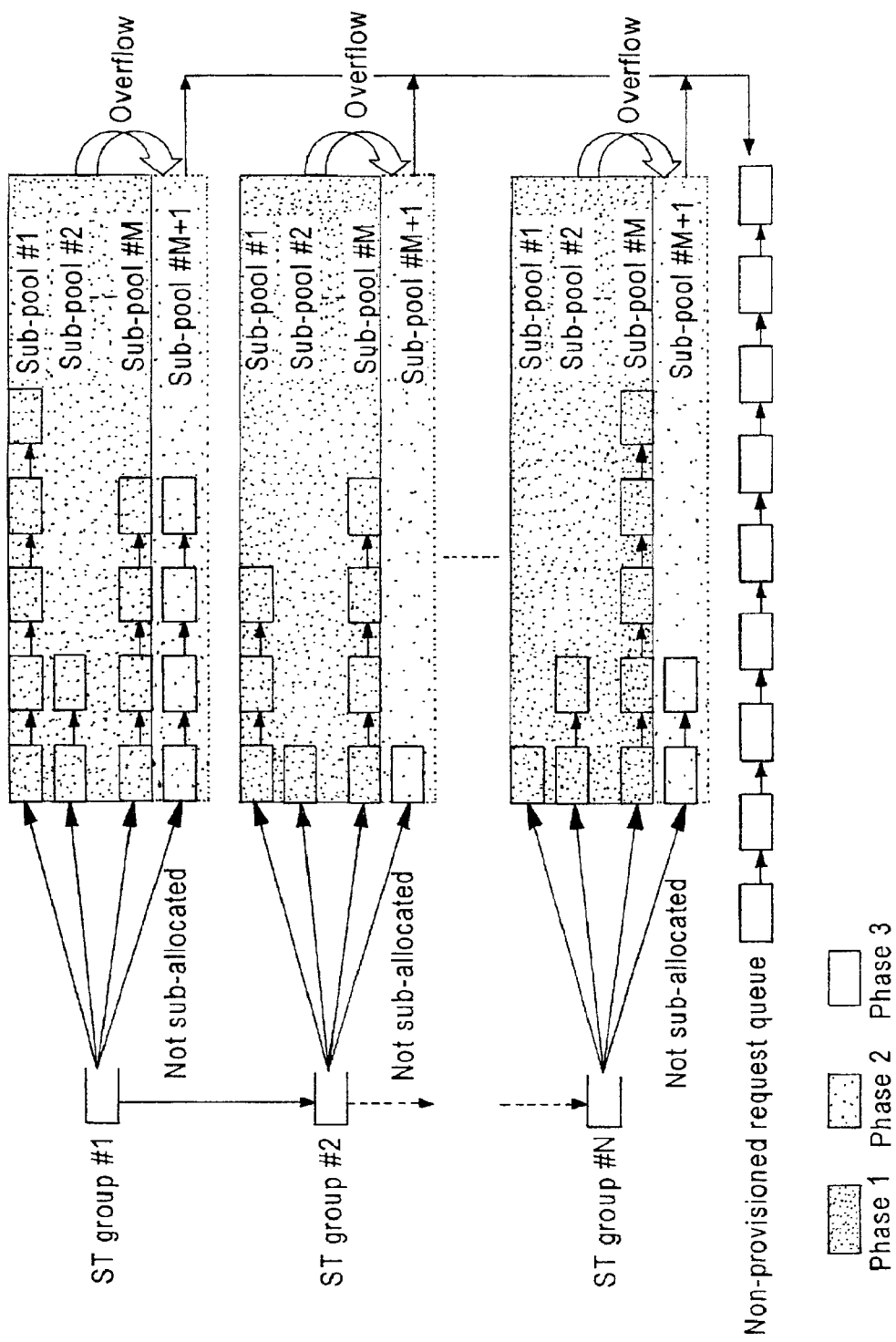
FIG. 6 is a diagram of the queues employed for 3-phase capacity allocation, according to an embodiment of the present invention.

FIG. 6 shows a diagram of the queues employed for 3-phase capacity allocation, according to an embodiment of the present invention. There are also two tables required per pool (in the alternative embodiment involving the use of two CCs), specifying thresholds for every uplink spot beam and every downlink spot beam. These tables are uploaded from the hub 201 and are maintained by the multiple CCs (e.g., two CCs) as in an aggregate congestion threshold table. These two tables constitute two additional checks that must be made for each allocation of a provisioned request. They must be updated along with the aggregate congestion threshold table for every allocation. If downlink pool thresholds are per region (i.e., groupings of spot beams) instead of per spot beam, this constitutes an extra check for each provisioned request to map the downlink spot beam specified in the request into the downlink region of that spot beam In Phase 1, every request is processed against the uplink and downlink tables for the sub-pool. In Phase 2, every request is processed against the uplink and downlink tables for the ST group pool. Finally in Phase 3, every request is processed against the aggregate downlink congestion threshold table. A bandwidth request is queued to a provisioned global queue (per uplink spot beam, channel data rate, ST group) if it specifies a valid pool ID. The term "global" refers to the fact that the queue is not particular to any channel. As indicated previously, a sub-partition request specifies both the ST group pool ID and the sub-pool ID; an ST group request specifies only the ST group pool ID. A non-provisioned request simply does not use a valid pool ID in its request message. In an exemplary embodiment, an ST (e.g., 203 and 205) can have multiple simultaneous provisioned and non-provisioned requests, but it can only specify one pool ID and one sub-pool ID at a time. Provisioned requests are kept on (per uplink spot beam, per channel data rate) global queues per ST group pool and per sub-pool. All non-provisioned requests from an uplink spot beam are kept on a global queue per uplink spot beam and per channel data rate.

The global request queues are organized as follows. Each ST group has an ST group request queue that consists of those requests that will be served in Phase 2. This includes partition requests and those sub-partition requests for the ST group that were not apportioned in Phase 1 and which are allowed to overflow. In addition, each ST group has a number of sub-pool queues (one per sub-group within an ST group) that consist of those requests that specified both a sub-pool and an ST group pool. These requests are served first (Phase 1) in the allocations. Therefore, the total number of queues (per uplink spot beam, per channel data rate) required for provisioned requests is $N*(M+1)$, where N is the number of ST groups supported and M is the average number of sub-pools for each ST group.

In addition, there is also a global queue for non-provisioned requests. Large arrows on the left indicate direction of processing of sub-pools associated with the ST group pool. Arrows on the right indicate the movement of unallocated requests that overflow first into Phase 2 and then into Phase 3.

Figure 7:
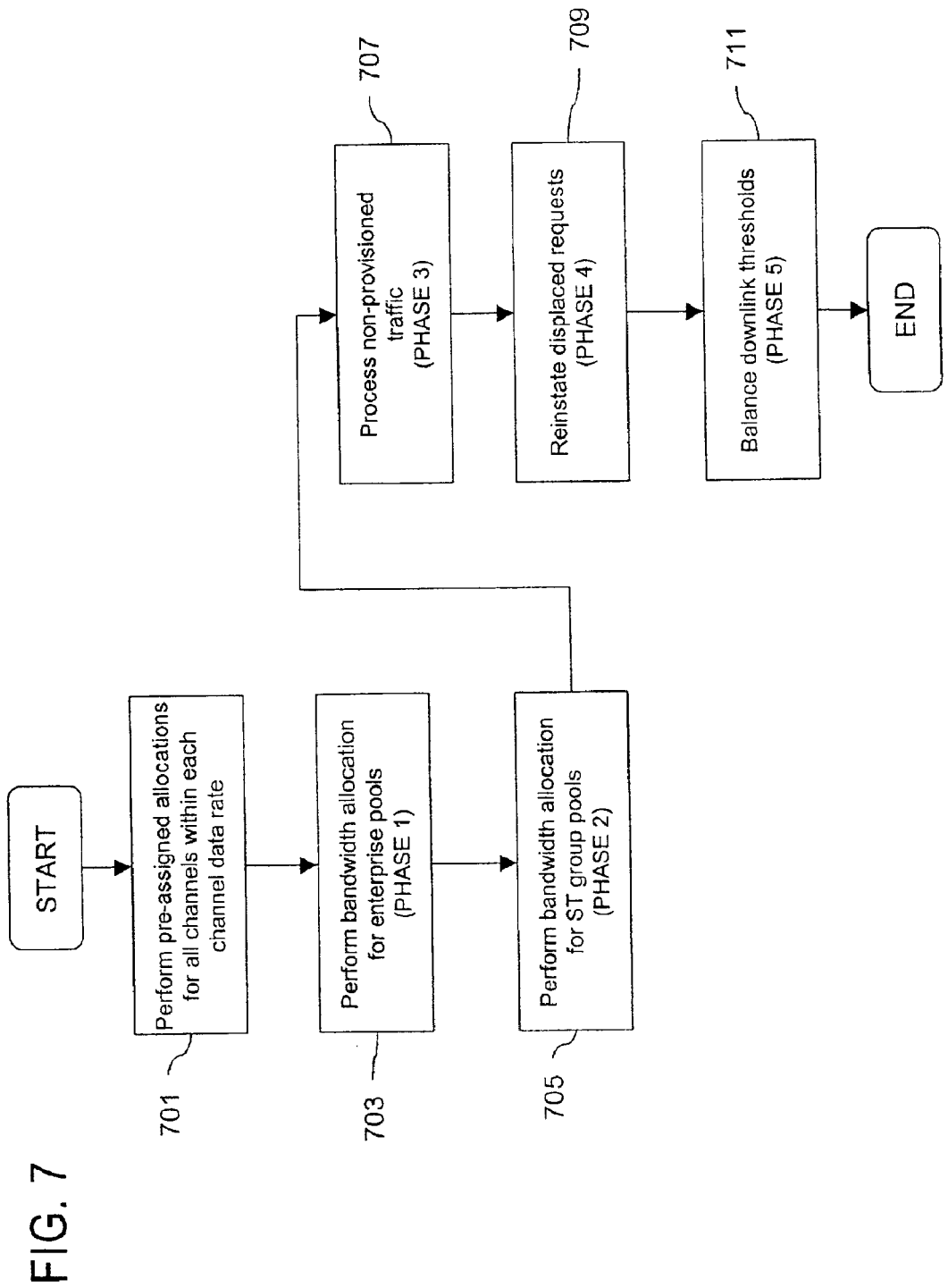
FIG. 7 is a flow chart of the bandwidth capacity apportioning process, according to an embodiment of the present invention.

FIG. 7 is a flow chart of the bandwidth capacity apportioning process, according to an embodiment of the present invention. The apportioning process loops over all uplink beams and all channel data rates within each uplink beam. In step 701, the apportioning process performs pre-determined (i.e., pre-assigned) allocations while looping over all channels within each channel data rate, starting with the lowest-numbered channel. These pre-determined allocations correspond to a dedicated channel that does not directly participate in the bandwidth apportionment process of FIG. 5. That is, these allocations are not made from this process; for example, time sensitive applications (e.g., video transmission) may require a fixed portion of the system capacity. When the apportioning process completes the rate allocations for a channel data rate, it performs Phase 1, starting with the highest-numbered channel available for bandwidth allocations. After the apportioning process completes the pre-determined allocations and Phase 1 allocations for all channel data rates and all uplink beams, the apportioning process cycles back over all uplink beams and channel rates to perform Phase 2. This is repeated for Phase 3.

Phase 1 involves the servicing of the sub-pools. In step 703 (Phase 1), apportioning process loops over all available channels and all sub-partition requests for all ST groups. Only these requests are processed in the first phase. For each request, apportioning process checks the requested bandwidth is available and the thresholds specified in the uplink and downlink tables for that sub-group pool. The request is granted the minimum of all these values. If the request cannot be granted any bandwidth at all and the request belongs to a sub-pool that is allowed to overflow, the request is moved to the ST group queue (one level higher than the ST sub-group queues) where it will be processed again in Phase 2. If the request is allocated, the bandwidth amount is subtracted from the pool tables and the aggregate downlink congestion threshold table.

Phase 2 involves servicing of at the ST group pool level. In step 705 (Phase 2), apportioning process loops over all available channels and all requests in the ST group specific queue for all ST groups. For each request, apportioning process checks the requested capacity against the available uplink capacity and the thresholds specified in the uplink and downlink tables for the ST group pool. The request is granted the minimum of all these values. If the request cannot be granted any bandwidth at all and the request belongs to a pool or sub-pool that is allowed to overflow, the request is moved to the non-provisioned queue where it will be processed again in Phase 3. If the request is allocated, the allocated bandwidth are subtracted from the pool tables and the aggregate downlink congestion threshold table.

During the Phase 3 allocation, the non-provisioned requests are processed. In step 707 (Phase 3), apportioning process again loops over all uplink beams, channel data rates and available channels within channel set, to service all the requests in the non-provisioned queue. For each request, apportioning process checks the requested bandwidth against the uplink bandwidth available on the channel and a downlink congestion threshold from the aggregate downlink congestion threshold table. The request is granted the minimum of all these values. If the request cannot be granted any bandwidth at all, the apportioning process skips the request and moves to the next request. If the request is allocated, the assigned slots are subtracted from the pool tables (i.e., uplink and downlink) and the aggregate downlink congestion threshold table.

Next, in step 709 (Phase 4), the CC reinstates the displaced requests. After all the allocations are done, those requests that were displaced from their original queues in Phase 1 and Phase 2 (because their pool thresholds were already met) are revisited by manipulating pointers, instead of repeatedly accessing memory to copy each request. This is performed so that these requests can compete fairly with the other requests in Phase 1 for ST sub-group guaranteed capacity, or in Phase 2 for ST group guaranteed capacity. Valid sub-partition requests that are in the non-provisioned queue or in the ST group queues are moved back to the ST subgroup queues. Valid partition requests that are in the non-provisioned queue are moved back to the ST group queue.

In step 711 (Phase 5), the downlink threshold tables for each pool are balanced among multiple CCs (if multiple CCs are implemented), using a method similar to that currently designed for the downlink congestion threshold table.

Bandwidth requests remain on the global queue and are served directly from this queue in each frame, in which a round-robin pointer ensures fairness within each queue. Two positive results are achieved using this approach. First, when processing requests belonging to a particular pool, the apportioning process ensures that over multiple frames, different requests are provided with the first opportunity to obtain guaranteed bandwidth for that pool. Second, all the other requests of that pool are free to be moved around over any available channels after the guaranteed capacity for that pool has been apportioned. Accordingly, requests are not tied down to a particular channel.

The algorithm can be designed to incorporate a load-balancing scheme similar to the current algorithm, which only operates at low loads. A threshold per uplink spot beam indicates the number of requests on all the global queues for that uplink spot beam. Each request (or ST) maintains the channel of its last allocation. If the threshold is such that every request on the global queues can be put on its own channel, then the channel pointer per request (or ST) is used to determine the channel for an allocation. If the threshold indicates more than one or two requests per channel for load-balancing, that uplink spot beam can be considered to be out of low load conditions, and so load-balancing and channel associations will be disabled.

The apportioning process may not return to service provisioned traffic with unused capacity after the non-provisioned traffic has been apportioned. This allows the performance impact to be reduced by restricting movement of provisioned requests only within the sub-partition pools and the ST group pools. Provisioned requests that are not served in Phase 2 will not be further demoted to the non-provisioned list, and so will not have to be reinstated in Phase 4.

To provide for some degree of unused capacity to be made available to the provisioned requests, apportioning process may track the total unused capacity requested by non-provisioned requests. The remaining capacity would be unused if the aggregate downlink congestion check allowed all these non-provisioned requests to be apportioned all their requested capacity. This unused capacity can be distributed over all the ST group pools at the start of allocations, so that provisioned requests will have a better chance in Phase 2 than with the process of FIG. 6, in which the requests are demoted to the non-provisioned queue.

In the apportioning process, ST group-specific requests are processed up to the capacity guaranteed for each ST group in Phase 2. This phase can be combined with Phase 1, as described in FIG. 8. The result is a reduction in the number of processing loops required for BC, and a consequent reduction in the negative performance impact.

Figure 8:
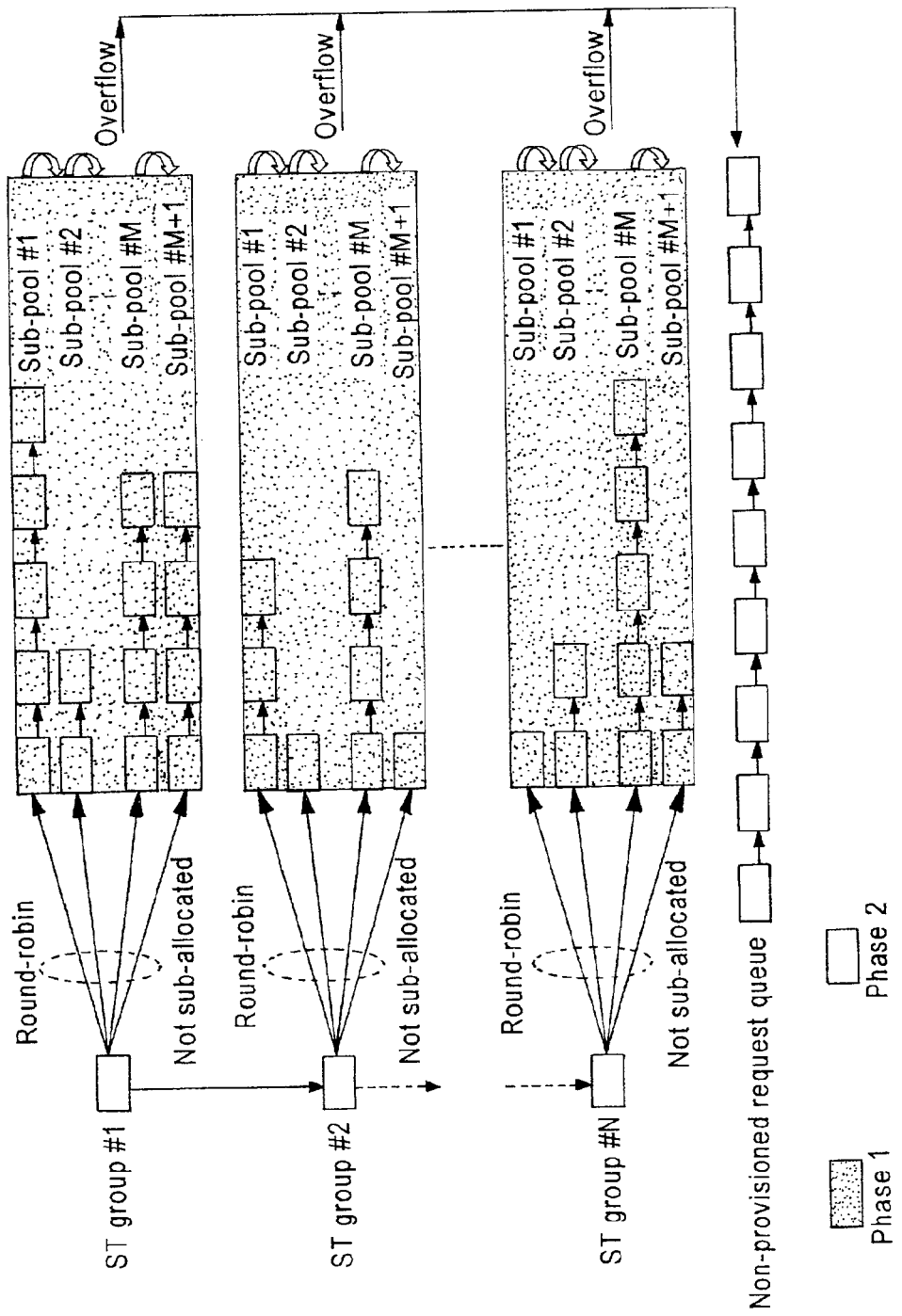
FIG. 8 is a diagram of the queues employed for 2-phase capacity allocation, according to an embodiment of the present invention.

FIG. 8 shows a diagram of the queues employed for 2-phase capacity allocation, according to an embodiment of the present invention. In Phase 1, instead of processing only the sub-partition requests, the apportioning process processes all the ST group pools completely, including all the sub-pools per ST group pool. In every frame and for every ST group pool, apportioning process begins with a different sub-pool and allocates the requests up to its sub-pool guarantees on the uplink and downlink. Any remaining requests are added to the non-provisioned list of requests. For the second sub-pool in the ST group pool, its requests will be serviced using thresholds that are the sum of its guaranteed thresholds and any unused guaranteed capacity for the previous sub-pool of the ST group pool. Proceeding in this manner, apportioning process will finally process the last sub-pool for an ST group pool using thresholds that are the sum of its guaranteed thresholds and all unused guaranteed capacity for the other sub-pools of the ST group pool.

Allowing the apportioning process to start from a different sub-pool in each frame minimizes the possibility that the most congested sub-pool is always served only up to its guarantee and is never able to compete for the rest of the ST group pool. This kind of round-robin processing allows for a good degree of fairness and for a congested sub-pool to be able to use up whatever ST group capacity is unused by one of its other sub-pools.

Eliminating uplink pools so that only downlink pools need to be checked for provisioned requests can reduce the negative performance impact of the resource-partitioning scheme. If uplink blocking is a source of congestion, then to properly use its downlink guarantee, an ST sub-group may require guarantees for uplink access to that downlink. For this enterprise, there will have to be an uplink guarantee per uplink spot beam such that the sum of guarantees from all the uplinks to that downlink is greater than the guaranteed capacity to that downlink. However, if all STs 203 and 205 require such guarantees on the uplink, the system operator may not sell as much capacity of the system for provisioned traffic.

To address this issue, statistical guarantees are to be utilized. If the system operator allows an uplink pool to be provisioned separately with its own guaranteed capacity, then the sum of guaranteed uplink bandwidth may be greater than the available uplink bandwidth. This leads to a greater cost per bit. Instead, the system operator can guarantee the capacity only on the downlink, and address the uplink issue by provisioning the system so that provisioned requests do not experience significant blocking on the uplink. With the correct nix of provisioned and non-provisioned traffic, it is possible that although uplink blocking is high, no provisioned requests get blocked. This kind of provisioning may provide a reasonable statistical guarantee to uplink capacity without requiring strict uplink thresholds to be implemented in bandwidth control.

This approach ensures that provisioned requests that are demoted to lower-order queues after Phase 1 and Phase 2, are reinstated so that they can compete fairly again in the next frame. Removing this feature can reduce the cost of moving requests back each time. Requests that are unallocated in Phase 1 and Phase 2 are queued to the non-provisioned queue and left there to compete with other non-provisioned requests for unused capacity.

As discussed previously, requests that have been temporarily set aside can be reinstated by manipulating the pointers (queue index) associated with the queues. In calculating the queue index of the request queues, a number of assumptions are made for the sake of computational efficiency. First, all the queues occupy contiguous memory locations and are of the same fixed size. In addition, it is assumed that all uplink spot beams and channel rates have the same number of ST group pools, even if some of them are not used in certain uplinks. Further, the ST group pools have the same number of enterprise sub-pools, even if some of them are not used. In addition, it is assumed that the following parameters are initialized to zero: uplink spot beam IDs, transmit rates, ST group IDs and ST sub-group IDs. In an exemplary embodiment of the system 100, there are 112 uplink spot beams, and 4 channel rates per uplink spot beam. If N represents the number of ST group pools supported, and M the number of sub-pools per ST group pool. Then, every ST group pool has M+1 sub-pools; one for each sub-pool, and the one that is not sub-allocated. The total number of provisioned queues per uplink spot beam and channel rate is then N*(M+1); adding one for the non-provisioned queues yields the following:

Number of volume queues per uplink spot beam, per channel rate=$(N*(M+1))+1$     Eq. (1)

Number of volume queues per UL spot beam=$[(N*(M+1))+1]*4$     Eq. (2)

Total number of volume queues=$[(N*(M+1))+1]*4*112$     Eq. (3)

The apportioning process numbers the "miscellaneous" queue as the last queue in its list. For example, if there are 4 sub-pool queues within an ST group pool, they may be numbered from 0 to 3. Then the non-sub-partitioned queue within that pool will have an index of 4. With M enterprises per ST group (numbered 0 through M−1), the non-sub-partitioned queue has an index of M within that ST group's list of queues. Similarly the non-provisioned queue within an UL spot beam and channel rate (that has $[(N*(M+1))+1]$ queues) will have an index of N*(M+1).

According to an exemplary embodiment of the present invention, the indexing pseudo-code, below, may be used to calculate the queue index based on the UL spot beam ID (e.g., 0 through 111), the transmit rate (e.g., 0–3), the ST group ID (e.g., 0 through N−1) and the ST sub-group ID (e.g., 0 through M−1).

If invalid (UL_spot beam_ID) or invalid (Transmit_Rate)
  Discard request
If valid (UL_spot beam_ID) and valid (Transmit_Rate)

```
{
    Base_Address_1 = (UL_spot beam_ID *
    [(N * (M+1)) + 1] * 4) +
                        (Transmit_Rate * [(N * (M+1)) + 1]);
    If invalid (ST group_ID)
        {
            Base_Address_2 = N * (M+1);
            Base_Address_3 = 0;
        }
    Else
        {
            Base_Address_2 = ST group_ID * (M+1);
            If invalid (Enterprise_ID)
                Base_Address_3 = M;
            Else
                Base_Address_3 = Enterprise_ID;
        }
    Queue_ID = Base_Address_1 +
    Base_Address_2 + Base_Address_3;
}
```

The above pseudo-code is executed for each bandwidth request that is received. A request that belongs to an ST group and an ST sub-group specify both ST group ID and ST sub-group ID. An ST group-specific request that is not sub-partitioned will specify a valid ST group ID and an invalid enterprise ID. A non-provisioned request will specify an invalid ST group ID.

The first base address is calculated to narrow down the queue address space to the specified uplink spot beam and transmit rate. This is accomplished by multiplying the number of queues per uplink spot beam by the uplink spot beam ID and adding that to the product of the transmit rate and the number of queues per transmit rate. If a request specifies an invalid uplink spot beam ID or transmit rate, the request is rejected.

The second base address is calculated to further narrow down the queue address space to the specified ST group pool. If the ST group ID is invalid, the request is determined to be a non-provisioned request, and the queue index is to the last queue within the UL spot beam and transmit rate, following the rule that the miscellaneous queue is the last in its address space. The third base address is calculated to identify the enterprise queue within the ST group pool. An invalid ST sub-group ID produces an ST sub-group ID of M as explained earlier. The final queue index is the sum of these three base addresses.

Although the bandwidth apportionment procedure has been explained as being performed by the CC within satellite 207, according to one embodiment of the present invention, an alternative embodiment provides for execution of this procedure by a computer in the hub 201.

Figure 9:
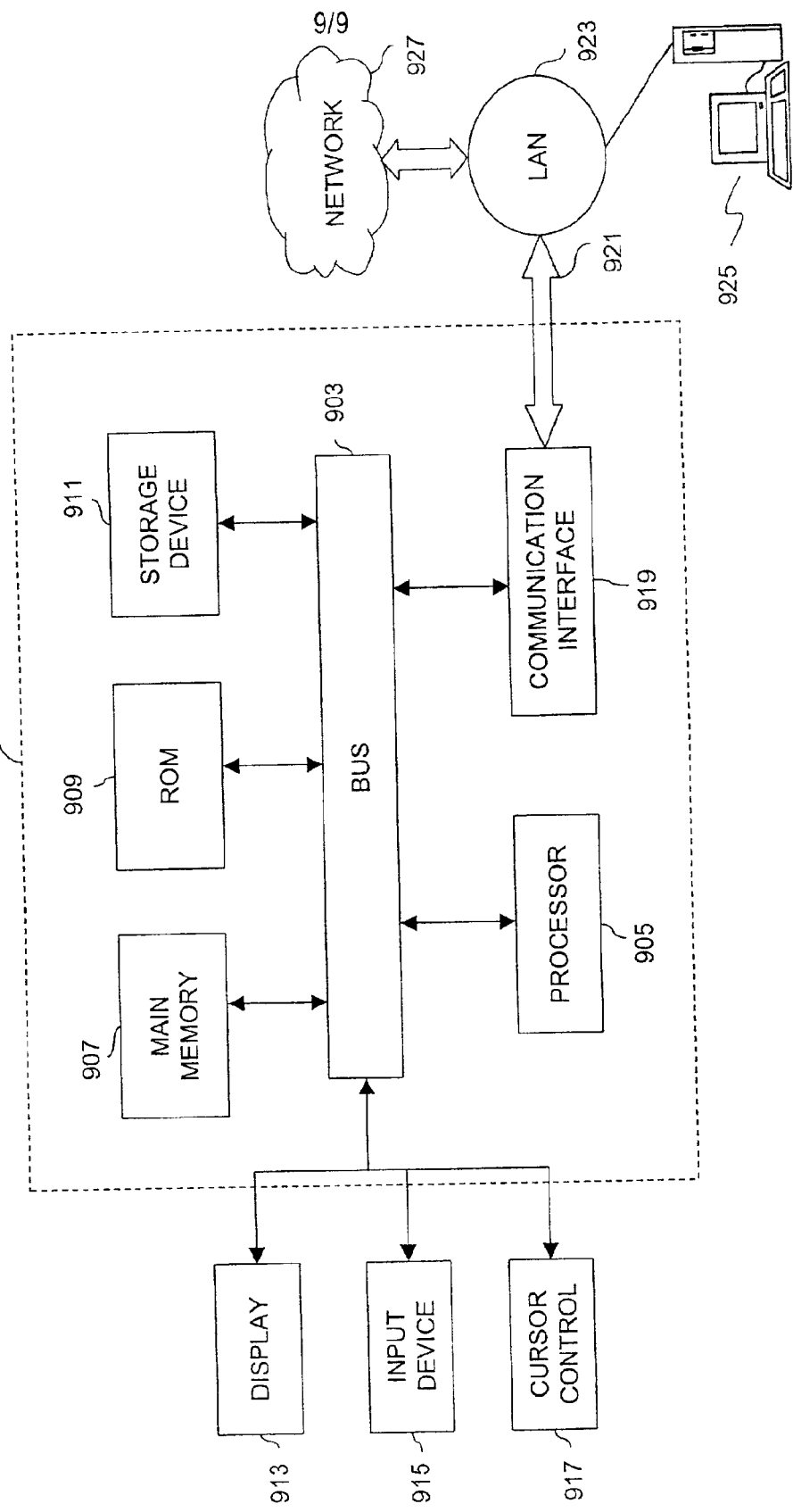
FIG. 9 is a diagram of a computer system that can perform the capacity allocations, in accordance with an embodiment of the present invention.

FIG. 9 illustrates a computer system 901 upon which an embodiment according to the present invention may be implemented to perform the phased allocation process. Computer system 901 includes a bus 903 or other communication mechanism for communicating information, and a processor 905 coupled with bus 903 for processing the information. Computer system 901 also includes a main memory 907, such as a random access memory (RAM) or other dynamic storage device, coupled to bus 903 for storing information and instructions to be executed by processor 905. In addition, main memory 907 may be used for storing temporary variables or other intermediate information during execution of instructions to be executed by processor 905. Computer system 901 further includes a read only memory (ROM) 909 or other static storage device coupled to bus 903 for storing static information and instructions for processor 905. A storage device 911, such as a magnetic disk or optical disk, is provided and coupled to bus 903 for storing information and instructions.

Computer system 901 may be coupled via bus 903 to a display 913, such as a cathode ray tube (CRT), for displaying information to a computer user. An input device 915, including alphanumeric and other keys, is coupled to bus 903 for communicating information and command selections to processor 905. Another type of user input device is cursor control 917, such as a mouse, a trackball, or cursor direction keys for communicating direction information and command selections to processor 905 and for controlling cursor movement on display 913.

According to one embodiment, the execution of the apportioning process of FIG. 7 and the indexing code of FIG. 8 are provided by computer system 901 in response to processor 905 executing one or more sequences of one or more instructions contained in main memory 907. Such instructions may be read into main memory 907 from another computer-readable medium, such as storage device 911. Execution of the sequences of instructions contained in main memory 907 causes processor 905 to perform the process steps described herein. One or more processors in a multi-processing arrangement may also be employed to execute the sequences of instructions contained in main memory 907. In alternative embodiments, hard-wired circuitry may be used in place of or in combination with software instructions. Thus, embodiments are not limited to any specific combination of hardware circuitry and software.

Further, the phased allocation process of the present invention may reside on a computer-readable medium. The term "computer-readable medium" as used herein refers to any medium that participates in providing instructions to processor 905 for execution. Such a medium may take many forms, including but not limited to, non-volatile media, volatile media, and transmission media. Non-volatile media includes, for example, optical or magnetic disks, such as storage device 911. Volatile media includes dynamic memory, such as main memory 907. Transmission media includes coaxial cables, copper wire and fiber optics, including the wires that comprise bus 903. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk of a remote computer. The remote computer can load the instructions relating to the phased allocation process remotely into its dynamic memory and send the instructions over a telephone line using a modem A modem local to computer system 901 can receive the data on the telephone line and use an infrared transmitter to convert the data to an infrared signal. An infrared detector coupled to bus 903 can receive the data carried in the infrared signal and place the data on bus 903. Bus 903 carries the data to main memory 907, from which processor 905 retrieves and executes the instructions. The instructions received by main memory 907 may optionally be stored on storage device 911 either before or after execution by processor 905.

Computer system 901 also includes a communication interface 919 coupled to bus 903. Communication interface 919 provides a two-way data communication coupling to a network link 921 that is connected to a local network 923. For example, communication interface 919 may be a network interface card to attach to any packet switched local area network (LAN). As another example, communication interface 919 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 919 sends and receives electrical, electromagnetic or optical signals that carry digital data streams representing various types of information.

Network link 921 typically provides data communication through one or more networks to other data devices. For example, network link 921 may provide a connection through local network 923 to a host computer 925 or to data equipment operated by a service provider, which provides data communication services through a communication network 927 (e.g., the Internet). LAN 923 and network 927 both use electrical, electromagnetic or optical signals that carry digital data streams. The signals through the various networks and the signals on network link 921 and through communication interface 919, which carry the digital data to and from computer system 901, are exemplary forms of carrier waves transporting the information. Computer system 901 can transmit notifications and receive data, including program code, through the network(s), network link 921 and communication interface 919.

The techniques described herein provide several advantages over prior approaches to providing bandwidth-on-demand for traffic in a satellite communication system. The system includes multiple satellite terminals, which request allocations of capacity of the system. The capacity is partitioned into a provisioned portion and an unprovisioned portion. The terminals are organized into pools and sub-pools. A control computer communicates with the terminals and allocates the provisioned portion of the capacity to the plurality of sub-pools of the terminals. The provisioned portion of the capacity is arranged into sub-partitions, wherein one of the sub-partitions is not associated with the sub-pools of terminals. The remaining sub-partitions are associated with the sub-pools of terminals. The control computer selectively allocates available capacity from the sub-partitions to one of the sub-pool terminals to permit overflow of traffic from the one sub-pool terminal, and selectively allocates the unprovisioned portion of the capacity to a terminal that is not a part of the pool of terminals. This approach advantageously provides an efficient BoD mechanism.

Obviously, numerous modifications and variations of the present invention are possible in light of the above teachings. It is therefore to be understood that within the scope of the appended claims, the invention may be practiced otherwise than as specifically described herein.

What is claimed is:

1. A method of allocating system capacity to a plurality of terminals in a communication switching system, the capacity being partitioned into a provisioned portion and an unprovisioned portion, a portion of the terminals constituting a pool having a plurality of sub-pools, the method comprising:

receiving a bandwidth request message from one of the terminals, the one terminal being configured to submit the bandwidth request message that selectively requests capacity from the provisioned portion and the unprovisioned portion based upon a type of traffic received by the one terminal;

allocating the provisioned portion of the capacity to the plurality of sub-pools of the terminals, the provisioned portion of the capacity being arranged into sub-partitions, wherein one of the sub-partitions is not associated with the sub-pools of terminals, and remaining sub-partitions are associated with the sub-pools of terminals;

selectively allocating available capacity from the sub-partitions to one of the sub-pool terminals to permit overflow of traffic from the one sub-pool terminal; and selectively allocating the unprovisioned portion of the capacity to the pool to permit overflow of traffic from a terminal within the pool and to a terminal that is not a part of the pool of terminals.

2. The method according to claim 1, wherein the partitions and sub-partitions of the capacity specify a maximum transmission rate for the corresponding terminals.

3. The method according to claim 1, further comprising:

configuring the partition and sub-partitions of the capacity based upon a prescribed time-of-day profile.

4. The method according to claim 1, wherein the bandwidth request message specifies a pool identification (ID) corresponding to one of the partitions of the provisioned portion of the capacity.

5. A method of allocating system capacity to a plurality of terminals in a communication switching system including a satellite network, the capacity being partitioned into a provisioned portion and an unprovisioned portion, a portion of the terminals constituting a pool having a plurality of sub-pools, the method comprising:

allocating the provisioned portion of the capacity to the plurality of sub-pools of the terminals, the provisioned portion of the capacity being arranged into sub-partitions, wherein one of the sub-partitions is not associated with the sub-pools of terminals, and remaining sub-partitions are associated with the sub-pools of terminals;

selectively allocating available capacity from the sub-partitions to one of the sub-pool terminals to permit overflow of traffic from the one sub-pool terminal; and selectively allocating the unprovisioned portion of the capacity to the pool to permit overflow of traffic from a terminal within the pool and to a terminal that is not a part of the pool of terminals, wherein each of the terminals is configured to receive high volume traffic and to transmit the traffic to a satellite of the satellite network in response to at least one of the allocating steps.

6. The method according to claim 1, wherein the partitions and sub-partitions in the provisioned portion have corresponding queues, the method further comprising:

storing the bandwidth request message in one of the queues.

7. A The method according to claim 6, further comprising:

maintaining an uplink table that contains uplink threshold values, and a downlink table that contains downlink threshold values for each of the queues that correspond to the pools.

8. The method according to claim 7, wherein the sub-partitions within each of the partitions are equal in quantity, the method further comprising:
reinstating a displaced bandwidth request by manipulating pointers associated with the queues.

9. A communication switching system comprising:
a plurality of terminals configured to request allocations of capacity of the system, the capacity being partitioned into a provisioned portion and an unprovisioned portion, a portion of the terminals constituting a pool having a plurality of sub-pools, wherein the terminals are further configured to transmit a bandwidth request message that selectively requests capacity from the provisioned portion and the unprovisioned portion based upon a type of traffic received by the one terminal; and
a control computer communicating with the plurality of terminals and being configured to allocate the provisioned portion of the capacity to the plurality of sub-pools of the terminals, the provisioned portion of the capacity being arranged into sub-partitions, wherein one of the sub-partitions is not associated with the sub-pools of terminals, and remaining sub-partitions are associated with the sub-pools of terminals, the control computer selectively allocating available capacity from the sub-partitions to one of the sub-pool terminals to permit overflow of traffic from the one sub-pool terminal, and selectively allocating the unprovisioned portion of the capacity to the pool to permit overflow of traffic from a terminal within the pool and to a terminal that is not a part of the pool of terminals.

10. The system according to claim 9, wherein the partitions and sub-partitions of the capacity specify a maximum transmission rate for the corresponding terminals.

11. The system according to claim 9, wherein the partition and sub-partitions of the capacity are based upon a prescribed time-of-day profile.

12. The system according to claim 9, wherein the bandwidth request messages specify pool identifications (IDs) corresponding to the partitions of the provisioned portion of the capacity.

13. A communication switching system comprising:
a plurality of terminals configured to request allocations of capacity of the system that includes a satellite network, the capacity being partitioned into a provisioned portion and an unprovisioned portion, a portion of the terminals constituting a pool having a plurality of sub-pools; and
a control computer communicating with the plurality of terminals and being configured to allocate the provisioned portion of the capacity to the plurality of sub-pools of the terminals, the provisioned portion of the capacity being arranged into sub-partitions, wherein one of the sub-partitions is not associated with the sub-pools of terminals, and remaining sub-partitions are associated with the sub-pools of terminals, the control computer selectively allocating available capacity from the sub-partitions to one of the sub-pool terminals to permit overflow of traffic from the one sub-pool terminal, and selectively allocating the unprovisioned portion of the capacity to the pool to permit overflow of traffic from a terminal within the pool and to a terminal that is not a part of the pool of terminals,
wherein each of the terminals is configured to receive high volume traffic and to transmit the traffic to a satellite of the satellite network in response to at least one of the allocations.

14. The system according to claim 12, further comprising:
a plurality of queues corresponding to the partitions and sub-partitions in the provisioned portion, the bandwidth request message being stored in one of the queues.

15. The system according to claim 12, wherein the control computer maintains an uplink table that contains uplink threshold values, and a downlink table that contains downlink threshold values for each of the queues that correspond to the pools.

16. The system according to claim 15, wherein the sub-partitions within each of the partitions are equal in quantity, the control computer reinstating a displaced bandwidth request by manipulating pointers associated with the queues.

17. A computer-readable medium carrying one or more sequences of one or more instructions for allocating system capacity to a plurality of terminals in a communication switching system, the capacity being partitioned into a provisioned portion and an unprovisioned portion, a portion of the terminals constituting a pool having a plurality of sub-pools, the one or more sequences of one or more instructions including instructions which, when executed by one or more processors, cause the one or more processors to perform the steps of:
receiving a bandwidth request message from one of the terminals, the one terminal being configured to submit the bandwidth request message that selectively requests capacity from the provisioned portion and the unprovisioned portion based upon a type of traffic received by the one terminal;
allocating the provisioned portion of the capacity to the plurality of sub-pools of the terminals, the provisioned portion of the capacity being arranged into sub-partitions, wherein one of the sub-partitions is not associated with the sub-pools of terminals, and remaining sub-partitions are associated with the sub-pools of terminals;
selectively allocating available capacity from the sub-partitions to one of the sub-pool terminals to permit overflow of traffic from the one sub-pool terminal; and
selectively allocating the unprovisioned portion of the capacity to the pool to permit overflow of traffic from a terminal within the pool and to a terminal that is not a part of the pool of terminals.

18. The computer readable medium according to claim 17, wherein the partitions and sub-partitions of the capacity specify a maximum transmission rate for the corresponding terminals.

19. The computer readable medium according to claim 17, wherein the one or more processors further perform the step of:
configuring the partition and sub-partitions of the capacity based upon a prescribed time-of-day profile.

20. The computer readable medium according to claim 17, wherein the bandwidth request message in the receiving step specifies a pool identification (ID) corresponding to one of the partitions of the provisioned portion of the capacity.

21. A computer-readable medium carrying one or more sequences of one or more instructions for allocating system capacity to a plurality of terminals in a communication switching system including a satellite network, the capacity being partitioned into a provisioned portion and an unprovisioned portion, a portion of the terminals constituting a pool having a plurality of sub-pools, the one or more sequences of one or more instructions including instructions which, when executed by one or more processors, cause the one or more processors to perform the steps of:

allocating the provisioned portion of the capacity to the plurality of sub-pools of the terminals, the provisioned portion of the capacity being arranged into sub-partitions, wherein one of the sub-partitions is not associated with the sub-pools of terminals, and remaining sub-partitions are associated with the sub-pools of terminals;

selectively allocating available capacity from the sub-partitions to one of the sub-pool terminals to permit overflow of traffic from the one sub-pool terminal; and selectively allocating the unprovisioned portion of the capacity to the pool to permit overflow of traffic from a terminal within the pool and to a terminal that is not a part of the pool of terminals wherein each of the terminals is configured to receive high volume traffic and to transmit the traffic to a satellite of the satellite network in response to at least one of the allocating steps.

22. The computer readable medium according to claim 20, wherein the partitions and sub-partitions in the provisioned portion have corresponding queues, and the one or more processors further perform the step of:

storing the bandwidth request message in one of the queues.

23. The computer readable medium according to claim 22, wherein the one or more processors further perform the step of:

maintaining an uplink table that contains uplink threshold values, and a downlink table that contains downlink threshold values for each of the queues that correspond to the pools.

24. The computer readable medium according to claim 23, wherein the sub-partitions within each of the partitions are equal in quantity, the one or more processors further performing the step of:

reinstating a displaced bandwidth request by manipulating pointers associated with the queues.

25. A communication switching system for allocating system capacity to a plurality of terminals, the capacity being partitioned into a provisioned portion and an unprovisioned portion, a portion of the terminals constituting a pool having a plurality of sub-pools, the system comprising:

means for receiving a bandwidth request message from one of the terminals, the one terminal being configured to submit the bandwidth request message that selectively requests capacity from the provisioned portion and the unprovisioned portion based upon a type of traffic received by the one terminal;

means for allocating the provisioned portion of the capacity to the plurality of sub-pools of the terminals, the provisioned portion of the capacity being arranged into sub-partitions, wherein one of the sub-partitions is not associated with the sub-pools of terminals, and remaining sub-partitions are associated with the sub-pools of terminals;

means for selectively allocating available capacity from the sub-partitions to one of the sub-pool terminals to permit overflow of traffic from the one sub-pool terminal; and means for selectively allocating the unprovisioned portion of the capacity to the pool to permit overflow of traffic from a terminal within the pool and to a terminal that is not a part of the pool of terminals.

26. The system according to claim 25, wherein the partitions and sub-partitions of the capacity specify a maximum transmission rate for the corresponding terminals.

27. The system according to claim 25, further comprising:

means for configuring the partition and sub-partitions of the capacity based upon a prescribed time-of-day profile.

28. The system according to claim 25, wherein the bandwidth request message specifies a pool identification (ID) corresponding to one of the partitions of the provisioned portion of the capacity.

29. A communication switching system for allocating system capacity to a plurality of terminals, the capacity being partitioned into a provisioned portion and an unprovisioned portion, a portion of the terminals constituting a pool having a plurality of sub-pools, the system comprising:

means for allocating the provisioned portion of the capacity to the plurality of sub-pools of the terminals, the provisioned portion of the capacity being arranged into sub-partitions, wherein one of the sub-partitions is not associated with the sub-pools of terminals, and remaining sub-partitions are associated with the sub-pools of terminals, the terminals communicating over a satellite network;

means for selectively allocating available capacity from the sub-partitions to one of the sub-pool terminals to permit overflow of traffic from the one sub-pool terminal; and means for selectively allocating the unprovisioned portion of the capacity to the pool to permit overflow of traffic from a terminal within the pool and to a terminal that is not a part of the pool of terminals wherein each of the terminals is configured to receive high volume traffic and to transmit the traffic to a satellite of the satellite network in response to at least one of the allocations.

30. The system according to claim 4, wherein the partitions and sub-partitions in the provisioned portion have corresponding queues, the system further comprising:

means for storing the bandwidth request message in one of the queues.

31. The system according to claim 30, further comprising:

means for maintaining an uplink table that contains uplink threshold values, and a downlink table that contains downlink threshold values for each of the queues that correspond to the pools.

32. The system according to claim 31, wherein the sub-partitions within each of the partitions are equal in quantity, the system further comprising:

means for reinstating a displaced bandwidth request by manipulating pointers associated with the queues.

33. A method of apportioning bandwidth among a plurality of terminals, the method comprising:

receiving a bandwidth request from one of the terminals for capacity, wherein the capacity includes a provisioned portion and an unprovisioned portion, and a portion of the terminals are designated as a pool that includes a plurality of sub-pools, the provisioned portion being allocated to the sub-pools and being arranged into sub-partitions, wherein one of the sub-partitions is not associated with the sub-pools and another one of the sub-partitions is associated with the sub-pools; and allocating available capacity from the sub-partition to one of the sub-pools including the one terminal to permit overflow of traffic based on the bandwidth request, wherein the provisioned portion is allocated to the pool for overflow of traffic for any one of the terminals.

34. An apparatus for supporting apportionment of bandwidth among a plurality of terminals, the apparatus comprising:

means for receiving a bandwidth request from one of the terminals for capacity, wherein the capacity includes a provisioned portion and an unprovisioned portion, and a portion of the terminals are designated as a pool that includes a plurality of sub-pools, the provisioned portion being allocated to the sub-pools and being arranged into sub-partitions, wherein one of the sub-partitions is not associated with the sub-pools and another one of the sub-partitions is associated with the sub-pools; and means for allocating available capacity from the sub-partition to one of the sub-pools including the one terminal to permit overflow of traffic based on the bandwidth request, wherein the provisioned portion is allocated to the pool for overflow of traffic for any one of the terminals.

* * * * *